United States Patent [19]

Witt

[11] 4,009,327
[45] * Feb. 22, 1977

[54] POLYMERIZATION OF OLEFINS
[75] Inventor: Donald R. Witt, Bartlesville, Okla.
[73] Assignee: Phillips Petroleum Company, Bartlesville, Okla.
[*] Notice: The portion of the term of this patent subsequent to Jan. 21, 1992, has been disclaimed.
[22] Filed: Dec. 10, 1974
[21] Appl. No.: 531,397

Related U.S. Application Data
[62] Division of Ser. No. 276,373, July 31, 1972, Pat. No. 3,875,079.
[52] U.S. Cl. .................................. 526/96; 526/106
[51] Int. Cl.² ...................... C08F 4/02; C08F 4/24; C08F 10/00
[58] Field of Search ..................... 260/93.7, 94.9 D; 526/96, 106

[56] References Cited
UNITED STATES PATENTS

| | | | |
|---|---|---|---|
| 2,825,721 | 3/1958 | Hogan et al. | 260/94.9 D |
| 3,072,627 | 1/1963 | Holm | 260/94.9 D |
| 3,862,104 | 1/1975 | Witt | 260/94.9 D |
| 3,875,079 | 4/1975 | Witt | 526/106 |
| 3,900,457 | 8/1975 | Witt | 260/94.9 D |

Primary Examiner—Alan Holler

[57] ABSTRACT

Olefin polymerization process employing a catalyst formed of a silica produced using lithium silicate. Ethylene polymers of higher melt index are produced than when sodium silicate is employed.

9 Claims, No Drawings

POLYMERIZATION OF OLEFINS

This application is a division of my copending application having Ser. No. 276,373, filed July 31, 1972, now U.S. Pat. No. 3,875,079.

This invention pertains to polymerization of olefins employing large pore silicas.

In one of its more specific aspects, this invention pertains to polymerization of olefins using as catalyst supports for preparing a chromium-containing catalyst silicas having a large pore size prepared from lithium silicate.

Methods for the polymerization of olefins, particularly ethylene and propylene, contained in olefin-containing streams, employing chromium-containing catalysts are known from U.S. Pat. No. 2,825,721 and Canadian Patent No. 853,414. Their disclosures are incorporated herein by reference. The silicas employed in such catalysts can be produced by introducing an aqueous solution of an alkali metal silicate into an aqueous solution of an acid, aging the hydrogel which forms, separating the water from the hydrogel to form a xerogel and using the xerogel comprising silica as the chromium oxide support. The method of the present invention used a xerogel made with lithium silicate as the alkali metal silicate. As a result, there is produced a chromium-containing catalyst by which polymers having a higher melt index are produced.

It is an object of the present invention to polymerize an olefin. It is another object to produce olefin polymers having a higher melt index than heretofore obtained using a silica support prepared from an alkali metal silicate. A further object of this invention is to polymerize ethylene to produce a high melt index polymer.

The method of this invention employs the lithium silicate derived catalyst. In general, the lithium silicate solution is introduced into the aqueous acid solution, preferably at a controlled rate, either of the solutions, optionally, containing a titanium and/or a chromium compound. The introduction can be made constantly or intermittently such that during the total period during which the addition is made from about 0.1 to about 15 weight percent of the total weight of the silica is added per minute.

The hydrogel is then aged at a temperature of from about 70° to 90° C for a period greater than one hour after which it is washed with water or an aqueous solution containing ammonium nitrate to reduce its alkali metal content to less than about 0.1 weight percent.

After washing, the hydrogel is contacted with a normally liquid, oxygen-containing organic compound which is soluble in water. The hydrogel can be washed repeatedly with the organic compound or azeotropic distillation of the organic compound-water mixture can be employed to separate the water from the hydrogel and to form a substantially water-free xerogel. The xerogel is then impregnated with an anhydrous chromium-containing compound and heat activated to produce a catalyst active in olefin polymerization.

At any point in the foregoing procedure, chromium, titanium, or other adjuvants can be incorporated in the hydrogel or xerogel. Preferably, a titanium-containing compound will be contained in the aqueous acid solution into which the aqueous lithium silicate solution is introduced.

Lithium silicate is used in the form of a silicate solution containing, as normally expressed, at least 0.5 weight percent lithium monoxide.

To illustrate the best mode of preparing a catalyst employed by this invention, a series of hydrogels were prepared under substantially identical conditions employing a sodium silicate solution and lithium silicate solutions.

As described above, all gels were prepared by introducing the silicate solution into sulfuric acid solution, aging the hydrogel which formed at 80°-90° C for about four hours, washing the aged hydrogel with aqueous ammonium nitrate solution containing 0.5 weight percent $NH_4NO_3$ and then with deionized water or distilled water and separating the water from the hydrogel employing ethyl acetate and azeotropic distillation. The xerogel was recovered and was impregnated with a hydrocarbon solution of t-butyl chromate to produce silicas containing about 1 weight percent chromium. The chromium-impregnated silicas were then activated at about 1600° F in air.

The resulting catalysts were employed in ethylene polymerization according to the invention.

Results were as follows:

| Compositions of the Silicate Solution, Wt. % | | | Reactants | | Gel | |
|---|---|---|---|---|---|---|
| $Na_2O$ | $Li_2O$ | $SiO_2$ | Silicate, gms | $H_2SO_4$, gms | Wt.% $SiO_2$ | Polymer Melt Index |
| 8.9 | 0 | 28.7 | 183 | 27 | 8.2 | 3.6 |
| 0 | 1.6 | 18.8 | 400 | 17.4 | 8.2 | 5.0 |
| 0 | 1.6 | 18.8 | 400 | 17.4 | 8.4 | 5.7 |
| 0 | 2.2 | 20.7 | 246 | 19 | 7.8 | 4.0 |
| 0 | 2.2 | 20.7 | 300 | 19 | 7.8 | 4.7 |

While the relative amounts of $SiO_2$ and alkali metal monoxide in the silicate solutions varied somewhat, the amounts of $SiO_2$ in the gels of Runs 1 and 2 of the table were comparable and the others were similar. In view of this, the above data indicate that the employment of lithium silicate does result in the production of a silica which, when employed as a component of an olefin polymerization catalyst, is effective in producing olefin polymers of higher melt index.

Reasonable variation and modification are possible within the scope of the foregoing disclosure and claims to the invention the essence of which is that a lithium silicate-derived large size pore silica is employed as a catalyst support in polymerizing an olefin.

I claim:

1. A method for polymerizing olefins which comprises contacting an olefin-containing stream with a chromium oxide catalyst active for olefin polymerization and comprising a silica-containing composition prepared by:
   a. introducing an aqueous lithium silicate solution into an aqueous acid solution to form a hydrogel;
   b. aging the hydrogel;
   c. washing the hydrogel to reduce the alkali metal content of the hydrogel;
   d. contacting the hydrogel with a normally liquid, oxygen-containing, water-soluble organic compound to separate water from said hydrogel and to form a xerogel; and
   e. recovering the xerogel as the silica-containing composition.

2. A method for polymerizing olefins which comprises contacting an olefin-containing stream with a chromium-containing catalyst active for olefin polymerization and comprising a silica-containing composition prepared by the method of claim 1 wherein
   a. said aqueous lithium silicate is introduced into said acid solution at a rate of addition of from about 0.1 to about 15 weight percent of the total quantity of the lithium silicate added per minute;
   b. said hydrogel is aged at a temperature within the range of from about 70° to 90° C for a period greater than one hour;
   c. the aged hydrogel is contacted with ethyl acetate to form a mixture and said mixture is azeotropically distilled to form said xerogel;
   d. said xerogel is impregnated with t-butyl chromate to produce a silica containing about 1 weight percent chromium; and
   e. the chromium-containing silica is activated to produce a catalyst active in ethylene polymerization.

3. The method of claim 1 in which said aqueous lithium silicate solution comprises at least 0.5 weight percent lithium monoxide.

4. The method of claim 1 in which said aqueous silicate solution contains a titanium-containing compound.

5. The method of claim 1 in which a titanium-containing compound is contained in said aqueous acid solution.

6. A method according to claim 1 wherein the olefin is ethylene.

7. A method according to claim 1 wherein the olefin is propylene.

8. A method according to claim 2 wherein the olefin is ethylene.

9. A method according to claim 2 wherein the olefin is propylene.

* * * * *